April 3, 1962 — H. R. SORENSON — 3,028,123
AIRPLANE WING ADJUSTABLE MOUNTING
Filed May 20, 1958 — 2 Sheets-Sheet 1
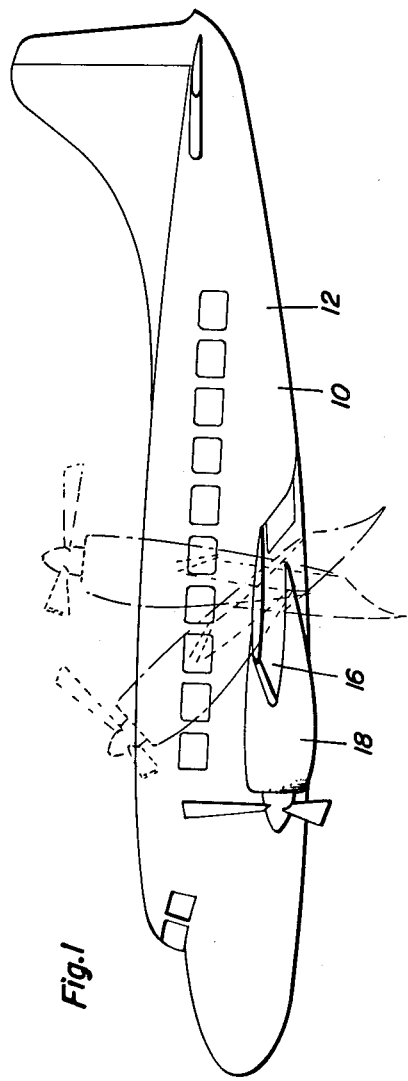
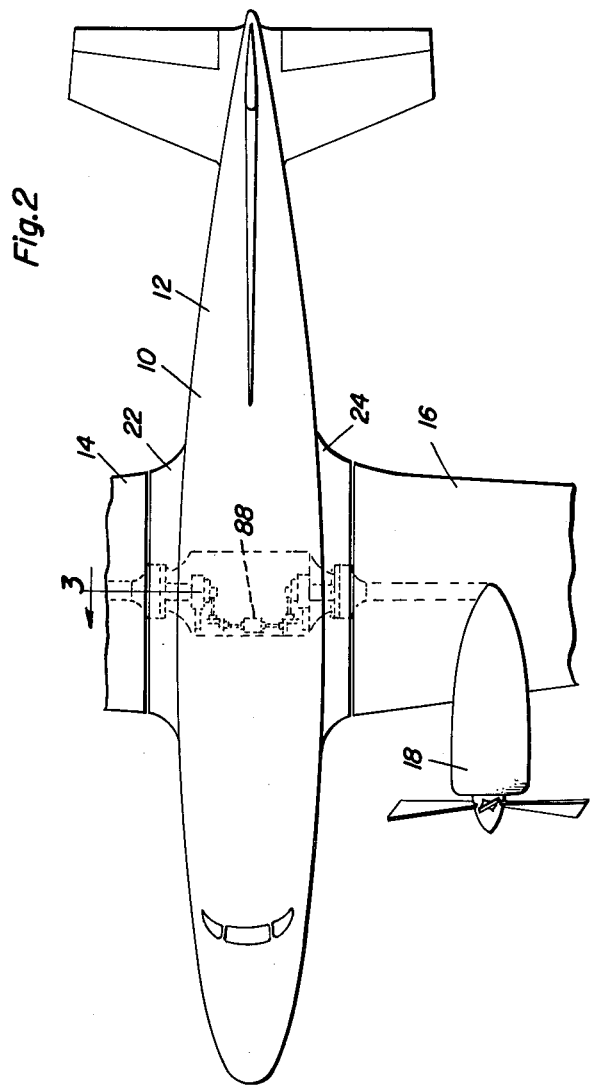
Howard R. Sorenson
INVENTOR.
BY Clarence A. O'Brien
and Harvey B. Jacobson
Attorneys April 3, 1962  H. R. SORENSON  3,028,123
AIRPLANE WING ADJUSTABLE MOUNTING
Filed May 20, 1958  2 Sheets-Sheet 2
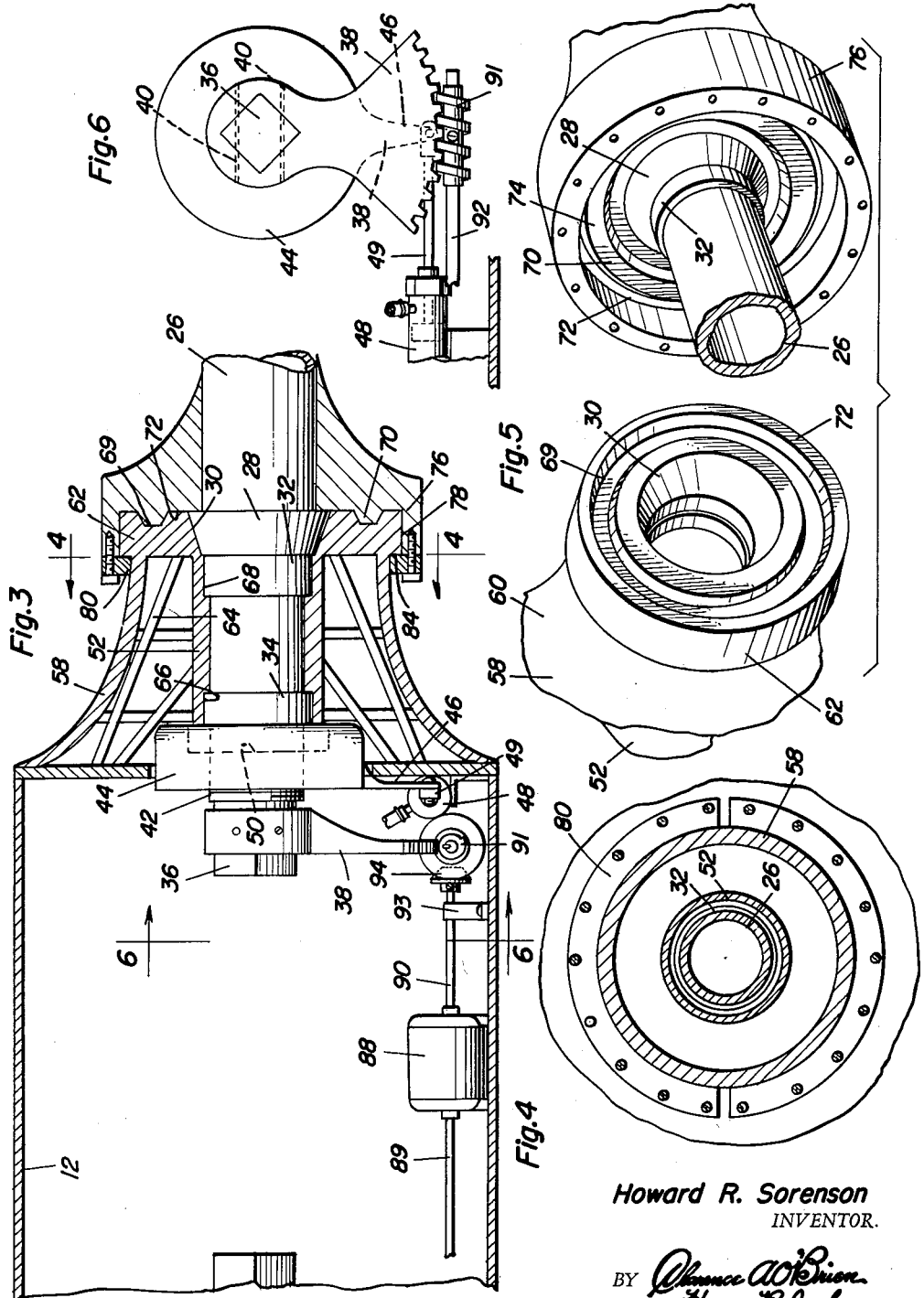
Howard R. Sorenson
INVENTOR.
BY Clarence A. O'Brien
and Harvey B. Jacobson
Attorneys

United States Patent Office 3,028,123
Patented Apr. 3, 1962

3,028,123
AIRPLANE WING ADJUSTABLE MOUNTING
Howard R. Sorenson, 2008 W. 73rd St.,
Los Angeles, Calif.
Filed May 20, 1958, Ser. No. 736,546
6 Claims. (Cl. 244—48)

This invention relates to improvements in aircraft and more particularly to means by which to mount the wings of the aircraft.

The object of this invention is to provide an aircraft wing with a mounting capable of having the wing tilt about a generally longitudinal axis in order to alter the position of the wing with respect to the fuselage and thereby alter the line-of-thrust of the engine or engines mounted on the wings.

The invention makes it possible to have the line-of-thrust of the engine, regardless of the type of engine, generally forward or at numerous angles to the generally forward direction of motion of the airplane.

A more particular object of the invention is to provide an improved structure by which to mount the wings so that they are capable of tilting through numerous angles and to numerous angular positions. The wing mounting means consist of a turret together with power applied structure for altering the wing position about a generally longitudinal axis and for locking the wing in the selected, adjusted position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side view of an airplane showing by dotted lines only two of a huge variety of angular positions that the wing and engines on the wing are capable of achieving.

FIGURE 2 is a fragmentary top view of the airplane in FIGURE 1.

FIGURE 3 is an enlarged sectional view taken on the line 3—3 of FIGURE 2.

FIGURE 4 is a sectional view taken on the line 4—4 of FIGURE 3.

FIGURE 5 is a perspective view of a part of the turret.

FIGURE 6 is an enlarged fragmentary sectional view taken on the line 6—6 of FIGURE 3.

In the accompanying drawings there is an airplane 10 which is provided with a fuselage 12 and a pair of wings 14 and 16 respectively. The wings are of similar construction except one is a starboard wing and the other is a port side wing. Each is provided with two or more engines, for instance nacelle mounted engines 18 on wings 14 and 16 respectively. These engines merely schematically represent any kind of engine, for instance a reciprocating propeller engine, a turbo-prop engine or a pure jet engine.

Wing 14 has a turret as does wing 16, by which to mount these wings on the fuselage at fairings 22 and 24. Both wing mounting structures are identical and therefore only the wing mounting structure for wing 14 is detailed in FIGURES 3–6 inclusive. For clarity only fuselage 12 is shown in FIGURE 3 that is, the wing and fairing 14 and 22 are removed to show the actual construction of the wing mounting turret. The wing has a spindle 26 rigidly attached to it, for instance it may be secured to the main spar and other internal unshown structure of wing 14. Conical collar 28 is on spindle 26 intermediate its ends and is adapted to fit in a conical seat 30 that shall be described in further detail subsequently. Two friction reducing bearings 32 and 34 are attached to the spindle 26 on the inboard side of collar 28, and the inner end of the spindle has a non-circular shank 36 to which segment 38 (FIG. 6) is fixed, as by having a non-circular opening into which the shank 36 is fitted and/or having pins 40 pass through the shank and the segment 38. Coarse screw threads 42 are on spindle 26 between shank 36 and bearing 34. A rather large nut 44 is on the screw threads 42 and has an arm 46 protruding therefrom. Means for oscillating the arm and thereby either tightening or loosening nut 44, are connected to the end of the arm. These means are composed of a cylinder 48 which can be either pneumatically or hydraulically operated, and the cylinder is double acting. Piston rod 49 of the cylinder is pivoted at one end to arm 46 whereby the nut is rotated either clockwise or counterclockwise depending on the direction of movement of the piston in cylinder 48. The nut 44 has a recess 50 opening through its outer face and within which a part of sleeve 52 is accommodated in order to form a reaction against which locking of the spindle 26 may be effected when the nut 44 is rotated in a direction which brings it to bear and bind against the end of sleeve 52.

The turret or mounting structure consists of a support 58 which may assume several configurations, one of which is that of a generally truncated conical wall 60 with the inner end thereof attached to a part of the airplane structure and the outer end thereof provided with an end plate 62 of special construction. Bracing 64 extends between the airplane structure, wall 60 and end plate 62 in order to assure that sufficient rigidity and strength exist in the organization. End plate 62 has the seat 30 formed in its center and within which the truncated cone-shaped collar 28 fits. Sleeve 52 is fixed to end wall 62 and has two inwardly opening recesses 66 and 68 within which bearings 32 and 34 are accommodated. A circular groove 69 opens through the outer face of plate 62 and has inclined side walls, accepting the circular rib 70 which has similar side walls to match with the side walls of groove 69.

Tongue 70 rises from the inner surface of wall 72 which is the innermost wall of socket 74. The socket is formed in a turret member that is fixed to spindle 26. The side wall 76 of the turret member is cylindrical and fits on the cylindrical outside surface 78 of end plate 62. An abutment 80, in the form of a ring, is fixed to the inner edge of side wall 78 and contacts the rear surface 84 of end plate 62. This assures a firm yet rotationally adjustable mounting for the wing. The portion of the turret attached to the fuselage is considered as the first turret assembly, while the portion of the turret attached to the wing is termed the second turret assembly.

There are means for operating both of the wings in unison. These means can assume a number of forms, one of which includes an electric motor 88 in the fuselage 12 and having a pair of shafts 89 and 90 extending from opposite ends thereof. These shafts drive worm gears, for example worm gear 91 (FIG. 6) that are attached to lay shafts 92 and mounted in bearings 93 within the fuselage. Miter gearing 94 is one suggested manner of drivingly connecting the shafts 89 and 90 to the two lay shafts 92 so that the worm gears 91 can be rotated in either the clockwise or counterclockwise direction depending on the direction of movement of shafts 89 and 90. The worm gears are enmeshed with the segments 38 for the two wings of the airplane.

In use the cylinder 48 for each wing rotates nut 44 of each turret in unison and in a direction to release the spindle 26 for motion. Then motor 88 is energized in the direction indicated by the pilot and this correspondingly rotates the wing spindles to adjust the angle of attack of the wings and thereby automatically adjusts the line-of-thrust of the engines on the wings to correspond therewith. Then the cylinder 48 is again actuated but in the opposite direction thereby tightening the nut 44 for each turret to engage the brake or plate elements 62 and 72 which holds the wings in the new fixed position, two of which are shown in FIGURE 1 in dotted lines.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wing mounting for an airplane, said wing mounting comprising a spindle attached to the wing, a turret assembly adapted to be fixed to the fuselage of the airplane and having an end plate, a second turret assembly having a second end plate confronting the first mentioned end plate, means mounting said turret assemblies on each other so that one turret assembly is movable with respect to the other turret assembly, said second turret assembly fixed to said spindle, means for rotating said spindle in selected directions, locking means to hold said spindle in a fixed, selected position, said locking means including a nut on said spindle, means for rotating said nut in selected directions to loosen and tighten said nut respectively thereby freeing and locking said spindle, said means mounting said turret assemblies together for movement with respect to each other including a circular groove and a circular rib, said groove and rib being on respective turret assembly end plates and engaged with each other, and an abutment carried by one of said turret assemblies and in engagement with the other of said turret assemblies and forming a reaction surface for said nut when the nut is tightened.

2. A wing mounting for an airplane, said wing mounting comprising a spindle attached to the wing, a first turret assembly adapted to be fixed to the fuselage of the airplane and having a first end plate, a second turret assembly having a second end plate confronting said first end plate, means mounting said turret assemblies on each other so that one turret assembly is movable with respect to the other turret assembly, said second turret assembly fixed to said spindle, means for rotating said spindle in selected directions, locking means to hold said spindle in a fixed, selected position, said locking means including a nut on said spindle, means for rotating said nut in selected directions to loosen and tighten said nut respectively thereby freeing and locking said spindle, said means mounting said turret assemblies together for movement with respect to each other including an engaged circular groove and a circular rib in said first and second end plates, means carried by one of said turret assemblies and in engagement with the other of said turret to prevent said assemblies from separating, the first turret assembly having a sleeve through which said spindle is passed, a seat in said plate, said spindle having bearings in said sleeve, a collar on said spindle and in contact with said seat to prevent endwise movement between said assemblies.

3. In an airplane, the combination of a fuselage and a pair of wings, each wing having a spindle that protrudes inwardly of said fuselage, means in said fuselage for adjusting the angular position of said spindles and including a motor, an arm on the end of each spindle, means drivingly connecting said arms and said motor so that said arms are oscillated in response to actuation of said motor, a turret attaching each spindle to the fuselage for rotational adjustment of the spindle, means for locking said spindles in selected adjusted positions, each turret including a first turret assembly that is fixed with the fuselage, a second turret assembly that is fixed with one of said spindles, and means connected with both of said turret assemblies constraining the motion of said spindle with respect to said first turret assembly, said constraining means including a sleeve in said first turret assembly, a portion of said spindle mounted for rotation in said sleeve, an end plate on one of said turret assemblies, and a rib and groove means connected with said end plate and the second of said turret members respectively and in engagement with each other.

4. In an airplane, the combination of a fuselage and a pair of wings, each wing having a spindle that protrudes inwardly of said fuselage, means in said fuselage for adjusting the angular position of said spindle and including a motor, an arm on the end of each spindle, means drivingly connecting said arms and said motor so that said arms are oscillated in response to actuation of said motor, a turret attaching each spindle to the fuselage for rotational adjustment of the spindle, and means for locking said spindles in selected adjusted positions, said locking means including threaded portions on each spindle, nuts on each of said threaded portions, and means connected with said nuts for locking said nuts and for loosening said nuts on said spindle.

5. A wing mounting for an airplane, said wing mounting comprising a spindle attached to the wing, a turret assembly adapted to be fixed to the fuselage of the airplane and having an end plate, a second turret assembly, means mounting said turret assemblies on each other so that one turret assembly is movable with respect to the other turret assembly, said second turret assembly fixed to said spindle, means for rotating said spindle in selected directions, and locking means to hold said spindle in a fixed, selected position, said second turret assembly also including a plate adjacent said end plate and whereby said locking means pulls said spindle into said fuselage to engage said plates.

6. In an airplane, the combination of a fuselage and a pair of wings, each wing having a spindle that protrudes inwardly of said fuselage, means in said fuselage for adjusting the angular position of said spindle and including a motor, an arm on the end of each spindle, means drivingly connecting said arms and said motor so that said arms are oscillated in response to actuation of said motor, a turret attaching each spindle to the fuselage for rotational adjustment of the spindle, and means for locking said spindles in selected adjusted positions including a brake element on the spindle engageable with a brake element on the fuselage, the fuselage brake element being carried by said turret and the locking means including power means for forcing each spindle inwardly to engage the braking elements.

References Cited in the file of this patent
UNITED STATES PATENTS

| | | |
|---|---|---|
| 548,191 | Griscom | Oct. 22, 1895 |
| 1,463,171 | Mead | July 31, 1923 |
| 1,871,538 | Leupold | Aug. 16, 1932 |
| 1,891,166 | Leupold | Dec. 13, 1932 |
| 2,363,224 | Roseland | Nov. 7, 1944 |
| 2,382,824 | Solomon | Aug. 14, 1945 |
| 2,621,001 | Roman | Dec. 9, 1952 |
| 2,807,427 | Herrick | Sept. 24, 1957 |

FOREIGN PATENTS

| | | |
|---|---|---|
| 582,299 | Great Britain | Nov. 12, 1946 |